UNITED STATES PATENT OFFICE 2,433,458

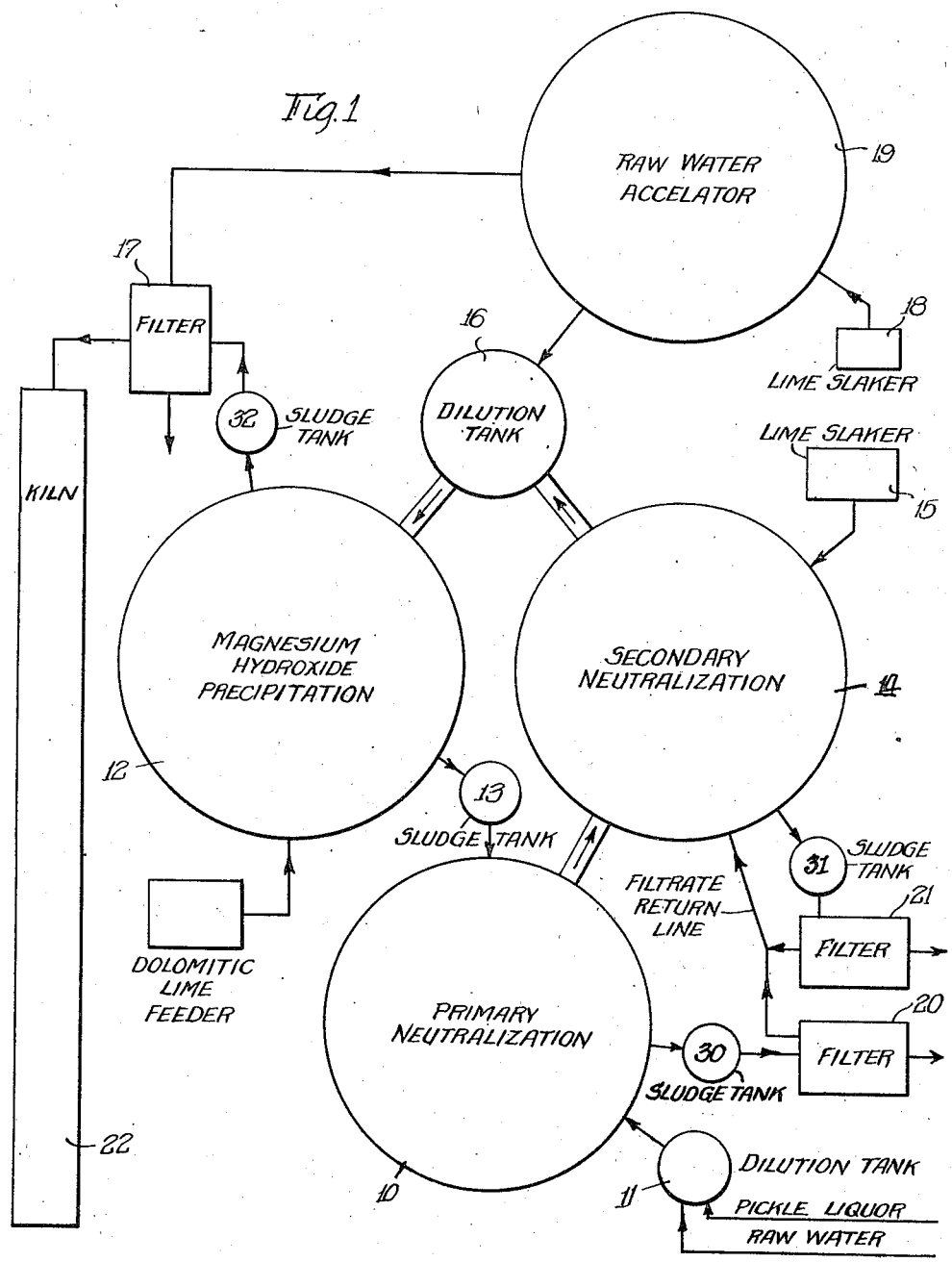

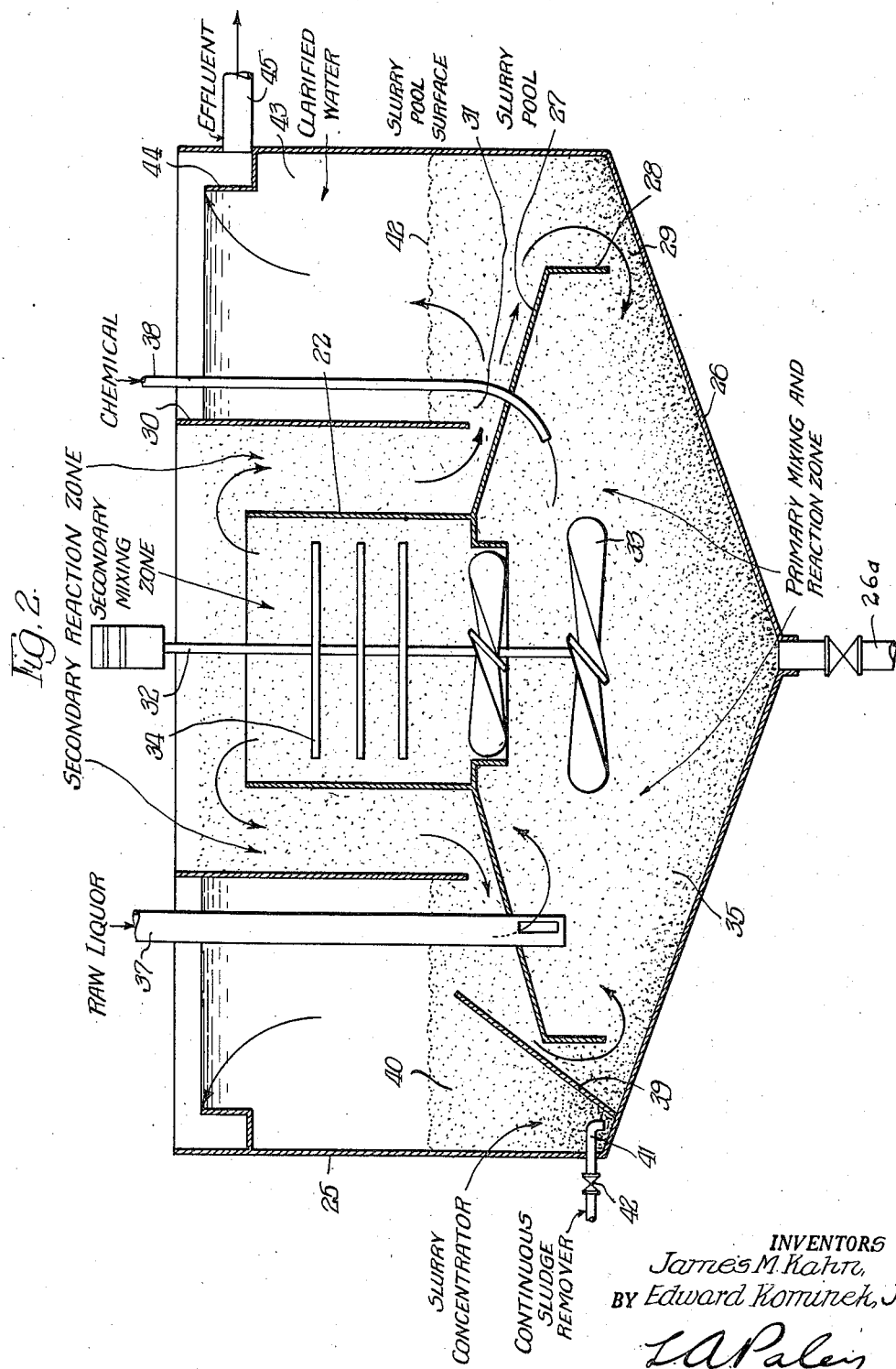

TREATMENT OF PICKLE LIQUOR

James M. Kahn, Atlanta, Ga., and Edward Kominek, Jr., Chicago, Ill., assignors to Infilco Incorporated, Chicago, Ill., a corporation of Delaware Application March 4, 1943, Serial No. 478,034

6 Claims. (Cl. 23—200)

This invention relates to a chemical process for treating acid wastes in general, and is a continuation in part of our copending application, Serial No. 457,234, filed September 3, 1942, and which was abandoned January 29, 1945 in favor hereof.

The problem of the disposal of waste acid liquor is sometimes serious. In some cases the quantity to be disposed of may be as much as a million gallons per day or more. The strength of such an acid waste will usually vary more or less periodically but it may at times contain as much as 1% of acid or more. Such quantities of acid waste cannot ordinarily be discharged into a stream for disposal without prior treatment. Sometimes there is present also some other objectionable impurity as, for instance, iron or other metallic salts in pickle liquor. It has been common practice to run such waste acid liquor over or through beds of broken limestone. Theoretically, this should be effective, but practically it is not in general satisfactory for various reasons, such as the coating of the stone with deposits or coatings of insoluble substances present in the liquid or formed in the reaction. Dosing with fine quicklime or hydrated lime is effective but is expensive and requires treating and control apparatus to get the proper dosing and insure reaction without waste.

The invention further relates to the treatment of waste pickle liquor commonly produced by the steel industry in the acid pickling of steel.

The problem of disposal of waste pickle liquor is one of the major waste disposal problems of the heavy metal industries. The most common method of disposal has been by ponding, and by discharging of the waste liquor into rivers, lakes or tide waters whenever possible. Lime, limestone, or scrap iron can also be used to neutralize the excess acid, the resulting suspension being ponded so that solar evaporation or ground seepage would dissipate the water. Other methods have endeavored to develop a process whereby usable by-products could be manufactured and recovered, to compensate for the cost of treatment. These processes involve recovery of various iron compounds, the recovery of sulfuric acid, or of ammonium sulfate or gypsum. These processes have a disadvantage of comparatively high cost of installation, equipment, maintenance and operation, due to the corrosive nature of the liquor. Moreover, in many instances, there has been a lack of an adequate market for the by-products.

An object of this invention, therefore, is to provide a process of treating pickle liquor and other waste acid liquors which may be operated at a relatively low cost of installation, maintenance and labor.

Another object of the invention is to provide a process of treating acid liquor in which a marketable by-product is produced which may defray costs of treatment and enable the waste liquor disposal plant to be operated at a net profit; also to improve treating processes for such liquor in other respects hereinafter specified and claimed.

The invention hereinafter described results in the recovery of magnesium hydroxide or oxide, which is readily marketed as a raw material for the production of refractories, or which can be converted to magnesium metal, or which can be used as a basis for the production of other magnesium compounds. Other products of commercial value may be produced as a result of our process.

This invention in the case of pickle liquor comprises a stage process of cyclic nature. In a simple form the acid liquor is neutralized in a first step with a magnesium compound whereby a solution of a magnesium salt of the acid is obtained, this solution is then treated with dolomitic lime whereby the calcium hydrate or oxide of the lime will precipitate the magnesium of the solution as magnesium hydroxide, commonly called "magnesium hydrate," the magnesium hydrate of the dolomitic lime being left in solid form and obtained with the precipitated magnesium hydrate. A suitable part of the so obtained magnesium hydrate is returned to the step wherein the acid is neutralized while the remaining magnesium hydrate is available for any desired use.

Even in this simpler form certain precautions or additional steps may be necessary or desirable. Obviously if the liquid contains suspended impurities that would be objectionable if found in the magnesium hydrate a preliminary treatment such as filtration may be given. Also, if the addition of the dolomitic lime would result in the formation of some other precipitate beside magnesium hydrate, suitable measures can easily be taken to overcome this. Thus if the acid to be neutralized is sulphuric acid it may well be that the amount of calcium sulphate formed upon addition of the lime is beyond the solubility point thereof and in such case we contemplate an additional step wherein the liquid is diluted prior to the precipitation step.

As indicated by subsequent reaction formulae, this treatment may produce approximately double the quantity of magnesium hydroxide used in the initial stage of the neutralization. In this manner, approximately one-half of the magnesium hydroxide sludge recovered from the last unit can be recycled for subsequent neutralization; and the other portion can be filtered, dried, and calcined as required to produce a marketable magnesium compound. From one aspect our invention may be regarded as a way of securing magnesium oxide from dolomite by reaction with waste acid liquors that finally leave the magnesium in solid form as hydroxide or oxide while the calcium is retained in solution.

One particularly useful application of our invention is in the treatment of pickle liquor such as is produced in the iron or steel industry. Since this requires the complete stage treatment that our invention contemplates, we will for purposes of exemplification now describe our invention in connection with the treatment of such a pickle liquor. Furthermore because of its particular applicability in such a process we will, for purposes of illustration, describe our process as carried out in the apparatus sold under the trade name "Accelator." This apparatus is especially useful in carrying out liquid treatments involving chemical reactions and solids separation. It is to be understood, however, that other forms of apparatus may be used; also that in various cases depending upon the conditions as to character of liquid being treated, results sought, etc., the order of steps may sometimes be advantageously altered to some extent or some of the described steps entirely omitted.

The neutralization of pickle liquor with calcium hydroxide or oxide, with the precipitation of iron as ferrous hydroxide and the formation of calcium sulfate, generally requires a quantity of lime considerably in excess of the stoichiometric amount. When the lime slurry is combined with the pickle liquor, the surfaces of the lime particles are coated with a nearly impervious layer of ferrous hydroxide and sometimes calcium sulfate, thereby decreasing the availability of the lime, necessitating the use of a considerable excess for neutralization. The same difficulty will be encountered, but to a greater extent, if magnesium hydroxide were used for the neutralization, if suitable precaution were not taken to assure completeness of reaction. In this case, with the very slight solubility of magnesium hydroxide, the diffusion of hydroxide ion through the interstices of the coated particles would be exceedingly slow, and the efficiency of reaction very slight. By our process as described, these and other difficulties heretofore met with are overcome, and not only are the waste products put in readily disposable form but valuable by-products obtained.

Reference is to be had to the accompanying drawing forming a part of this specification, in which Figure 1 is a flow diagram showing the apparatus and process steps, and Figure 2 is a central sectional elevation of the "Accelator."

The flow diagram incorporates the equipment which is required when the process involves the precipitation and separation of metallic hydroxides in the primary and secondary stages of the treatment. When the process is applied to the treatment of acids which do not contain metallic salts, the flow diagram can be simplified as is hereinafter described.

Difficulties previously mentioned are avoided by carrying out the various stages of treatment in units or precipitation apparatus sold under the trade name "Accelator." By diluting the entering pickle liquor with several volumes of the circulating, already treated liquor, as in that apparatus, the tendency for the coating of the magnesium hydroxide particles is decreased, partly due to the precipitation being from a more dilute solution. Also, retention in suspension and circulation of the reaction solids allows a longer time for the reaction and utilization of the residual magnesium hydroxide.

The first stage of neutralization is carried out in a first or primary Accelator 10 under controlled conditions, after dilution in tank 11 if needed, the liquor being treated with a quantity of magnesium hydroxide obtained from magnesium hydroxide precipitation or final Accelator 12 and sludge tank 13 which will react completely with the acid in the pickle liquor. Our tests indicate that a desirable equilibrium is obtained at the pH of about 6.0, for which an optimum dosage of magnesium hydroxide can be determined. With a typical pickle liquor, at this point free acid and the acid of the ferric iron will have been neutralized and the ferric iron precipitated. The reaction between magnesium hydrate and ferrous iron salt proceeds so slowly that except with quite dilute solutions it is best to interrupt neutralization at this point and complete it later. However, it should be understood that the optimum conditions of neutralization will vary with the composition of the waste pickle liquor, as well as with the conditions of treatment.

During this partial neutralization, relatively large quantities of iron hydroxide are precipitated. By using the Accelator for this treatment, the sludge is concentrated to a minimum volume, and may be either disposed of by ponding, or may be filtered to recover the magnesium liquor contained and also to recover the iron salts.

In the figure the sludge from primary Accelator 10 is shown to be discharging into sludge tank 30 from which it is passed to filter 20, the filtrate going to a secondary neutralization unit or Accelator 14, the residue being disposed of in any suitable manner.

The partially neutralized liquor from primary Accelator 10 and filter 20 is treated in a second Accelator 14 with calcium hydroxide from lime slaker 15 to raise the pH to a point which will precipitate the heavy metals completely but not the magnesium. In the case of a pickle liquor containing ferrous sulfate, it is necessary to raise the pH to about 8.5 to 9.0, depending upon the conditions. The quantity of lime required for this second stage treatment may result in the production of calcium sulfate in excess of its solubility product. In this case, ferrous hydroxide and calcium sulfate will be obtained as the Accelator underflow. The clarified neutral liquor, obtained as the overflow, containing magnesium sulfate equivalent to the amount of magnesium hydroxide used in the initial stage of neutralization, will be saturated with calcium sulfate. Since the sludge from this stage will contain soluble magnesium salts it is shown as discharging into sludge tank 31 from which it passes to filter 21, the residue from which is disposed of. The filtrate is shown as returning to second Accelator 14, but it may go to the dilution tank, 16, or the third Accelator, 12.

It should be understood that this specific application describes the treatment of a waste pickle liquor containing ferrous sulfate and sulfuric acid. The invention also applies to other acidic waste liquors which may comprise hydrochloric acid, nitric acid, or any other acid used for these processes, as well as salts of the various heavy metals which may be involved. In such cases, it should be understood that the process is equally applicable, although the conditions of treatment may be considerably changed.

The effluent from second Accelator 14 is conveyed into third Accelator 12 for magnesium hydroxide precipitation, either directly or after dilution as in dilution tank 16.

The determining factor of the treatment will be the sulfate concentration of the neutralized acid, as it is necessary to dilute the liquor sufficiently to prevent calcium sulfate from precipitating when the liquor is treated with dolomitic lime in the third, or final, Accelator 12.

As the waste acids may vary in concentration because of wash or rinse water of lower composition being discharged periodically, our invention contemplates retaining the acid and wash water for a long enough period so that the wash water will dilute the acid to a minimum concentration thereby avoiding calcium sulfate precipitation.

Waste acid may vary considerably in composition. The composition of a typical sample of a pickle liquor produced in one steel plant was as follows:

| | Per cent |
|---|---|
| FeSO$_4$ | 5 |
| H$_2$SO$_4$ | 1.5 |

A typical sample of a pickle liquor from another steel plant had the following composition:

| | Per cent |
|---|---|
| FeSO$_4$ | 25 |
| Fe$_2$(SO$_4$)$_3$ | 5 |
| H$_2$SO$_4$ | 5 |

Although the Accelator is specified as the preferred means for conducting the neutralization, it is understood that these stages of the process could also be carried out in any apparatus which would provide adequate contact of the magnesium hydroxide with the liquor being treated, and other suitable conditions.

The overflow from the second Accelator 14 is diluted in tank 16 to the extent necessary to prevent subsequent precipitation of calcium sulfate. This diluted liquor is treated in the final Accelator 12 with slaked dolomitic lime, resulting in the precipitation of magnesium hydroxide, and the concentration of said newly formed magnesium hydroxide as well as the magnesium hydroxide or oxide which is introduced by the dolomitic lime. This reaction can be carried out in any type of neutralizing tank; but it has been found that the recirculation in an Accelator during treatment builds up a magnesium hydroxide sludge of maximum density, and results in complete utilization of the dolomitic lime. It has been definitely proven that the precipitation of magnesium hydroxide by such a process results in the production of crystalline magnesium hydroxide which can be dewatered readily by means of rotary vacuum filters, or any other type of filter used for the dewatering of crystalline materials.

The underflow from final Accelator 12 is shown going in part to sludge tank 13, from which the supply required to effect treatment in first Accelator 10 is taken, and in part to sludge tank 32. Obviously the sludge tank 13 can be omitted and the first Accelator 10 supplied with magnesium hydroxide from tank 32. The excess sludge that is available in tank 32, goes to filter 17, from which the cake goes to kiln 22, or other suitable treatment. The cake in the filter 17 may be washed with treated water from a raw water treating Accelator 19, or other suitable source of wash water, and the filtrate and wash water from the filter 17 go to waste.

As noted the liquor from the second or intermediate Accelator 14 is diluted with sufficient water in dilution tank 16 to prevent the precipitation of calcium sulfate in final Accelator 12 when the dolomitic slaked lime is added to the liquor. If this dilution water contains bicarbonates, it is desirably treated with slaked lime from slaker 18 in raw water treating Accelator 19 so that magnesium hydroxide produced will be pure. While dilution is shown as taking place in a dilution tank 16 for ease of illustration, such a special tank is obviously not necessary in many cases, it being sufficient to join conduits or deliver separate flows into final Accelator 12.

The reactions involved are as follows:

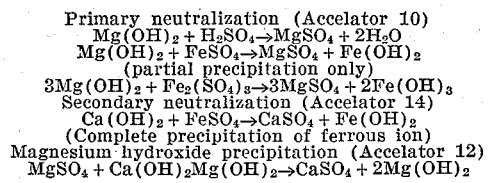

Primary neutralization (Accelator 10)
$Mg(OH)_2 + H_2SO_4 \rightarrow MgSO_4 + 2H_2O$
$Mg(OH)_2 + FeSO_4 \rightarrow MgSO_4 + Fe(OH)_2$
(partial precipitation only)
$3Mg(OH)_2 + Fe_2(SO_4)_3 \rightarrow 3MgSO_4 + 2Fe(OH)_3$
Secondary neutralization (Accelator 14)
$Ca(OH)_2 + FeSO_4 \rightarrow CaSO_4 + Fe(OH)_2$
(Complete precipitation of ferrous ion)
Magnesium hydroxide precipitation (Accelator 12)
$MgSO_4 + Ca(OH)_2 Mg(OH)_2 \rightarrow CaSO_4 + 2Mg(OH)_2$ An Accelator is illustrated in Figure 2 of the drawing. This Accelator consists of a tank 25 having a conical bottom 26 provided with a drain pipe 26a. A central draft tube 22 is provided with a frusto conical inclined shelf 27 which terminates in a downwardly extending cylinder 28 which is separated from the bottom 26 by a space 29. An outer draft tube 30 extends around the tube 22 and is separated from the shelf 27 by a space 31. A rotatably mounted vertical shaft 32 extends axially and vertically through the tube 22 and is provided with propellers 33 and paddles 34 so that slurry contained in the primary mixing and reaction zone 35 below shelf 27 is given a rapid upward movement and overflows the top of tube 22, then flows downwardly in outer draft tube 30 to and through spaces 31 and 29 to be recirculated by the propellers 33.

The raw liquor to be treated passes into zone 35 through a pipe 37 and treating chemical also passes into zone 35 through a pipe 38. The precipitation takes place in the presence of rapidly circulating slurry so that large flocs are produced which easily settle out. An inclined concentrator partition 39 forms a concentrator chamber 40 and a sludge draw-off pipe 41 extends into the bottom of chamber 40 and is provided with a valve 42 to permit intermittent or continuous removal of sludge from chamber 40. The slurry rises to level 42 in the clarifying chamber 43 and clear liquid rises to the top of chamber 43 to overflow into a launder 44 formed around the top inside of tank 25 and pass to a point of discharge through a pipe 45. Heavy particles of unreacted lime settle into conical bottom 26 and are withdrawn from time to time through pipe 26a.

In a simple form the cyclic steps of our process may be dispensed with and the magnesium precipitate obtained from the dolomitic lime in a very simple apparatus. Such a simple process may be used when treating a single acid or mixed acids when no metallic salt is present. Where conditions permit, as they occasionally may, all apparatus prior to the treatment tank 12 may be omitted and the acidic liquor, diluted as necessary, may be delivered directly into tank 12 where it is dosed with dolomitic lime. The quantity of the lime added should preferably be such that the acid will react with all of the calcium and but little if any of the magnesium, whereupon the magnesium oxide and hydrate will be left in solid form and may be removed through sludge tank 32 and filtered off or otherwise treated as desired. For this treatment the pH of the treated liquor is preferably controlled to a point corresponding to nearly but not quite complete neutralization of the lime. The pH of a saturated solution of $Mg(OH)_2$ is about 9.5 and that of a saturated solution of $Ca(OH)_2$ about 11.4. If therefore the treatment of the liquor is controlled by adjusting the feed of dolomitic lime to within this range, there will have been no solution of magnesium and there will be no excess of unused $Ca(OH)_2$. Desirably the pH is in the low end of the range. In this way the neutralization of the waste liquor effects a direct separation of the calcium and magnesium of the dolomite. It is contemplated that even in this simple form certain other steps may and sometimes will be required. The waste liquor may require clarification before dosage with the dolomite and may likewise require to be diluted to prevent precipitation of impurities with the magnesium. In some cases, as where the waste liquor varies considerably in acid content, this dilution may be secured by an equalizing tank of proper size ahead of the tank 12 in which neutralization takes place.

As an example of our process, the following data are disclosed:

TREATMENT OF PICKLE LIQUOR

*Composition of liquor*

| | Per cent |
|---|---|
| $FeSO_4$ | 5 |
| $H_2SO_4$ | 1.5 |

Diluted 1 to 20.

*1st stage treatment in tank 10*

0.088 lb. $Mg(OH)_2$ per gallon of liquor; pH of treated liquor 5.8; $Mg(OH)_2$ utilized 100%.

*2nd stage treatment in tank 14*

0.007 lb. $Ca(OH)_2$ per gallon of liquor; pH of treated liquor 8.4; Trace of iron left in liquor (less than 0.1 part per million).

*3rd stage treatment in tank 12*

0.2 lb. slaked dolomitic lime per gallon of liquor; $Mg(OH)_2$ recovered, 0.15 lb. per gallon.

In the claims to follow, the term "pickle liquor" will be understood to include all waste liquors containing acid with or without a salt of a metal. Thus another waste liquor which may be treated by our process is one containing a copper salt and hydrochloric acid.

We would state in conclusion that, while the illustrated examples constitute practical embodiments of our invention, we do not wish to limit ourselves precisely to these details, since manifestly the same may be considerably varied without departing from the spirit of the invention as defined in the appended claims.

Having thus described our invention, we claim as new and desire to secure by Letters Patent:

1. The process of treating pickle liquor containing free sulfuric acid, ferric sulfate and ferrous sulfate, which comprises mixing said pickle liquor with an amount of an aqueous suspension of magnesium hydroxide sufficient to bring the pH of said pickle liquor to approximately 6.0 and thereby precipitate ferric hydroxide and a limited amount of ferrous hydroxide from said pickle liquor, separating the liquid from said precipitate, and adding an amount of calcium hydroxide thereto sufficient to increase the pH of the pickle liquor to approximately 8.5, and precipitate the balance of iron therefrom.

2. The process as described in claim 1, comprising also mixing the residual magnesium sulfate and calcium sulfate solution formed by said reactions with dolomitic lime to precipitate magnesium hydroxide, the residual solution being kept sufficiently dilute to prevent precipitation of calcium sulfate therefrom.

3. The process of treating waste pickle liquor containing ferric sulfate, ferrous sulfate and free sulfuric acid which comprises establishing a primary neutralization zone, a secondary neutralization zone, and a magnesium hydroxide precipitation zone, maintaining in each of said zones a concentrated slurry containing suspended particles of like nature to those to be formed in said zone, maintaining a circulation of slurry in each of said slurry zones, separately introducing waste pickle liquor and magnesium hydroxide into the primary neutralization zone, thereby reacting the free acid, the ferric sulfate and a portion of the ferrous sulfate with the magnesium hydroxide to form a solution containing magnesium sulfate and to precipitate ferric hydroxide and a portion of ferrous hydroxide, separating the solution from said ferric hydroxide and ferrous hydroxide precipitated in said primary neutralization zone, separately passing the liquor from the primary neutralization zone and calcium hydroxide into the circulating slurry in the secondary neutralization zone, thereby reacting the balance of the ferrous sulfate with the calcium hydroxide to form a precipitate of ferrous hydroxide and a solution of magnesium sulfate and calcium sulfate, separating the solution from the precipitated ferrous hydroxide, the solution being kept sufficiently dilute to prevent the precipitation of calcium sulfate therefrom, and passing the solution into the circulating slurry in the magnesium hydroxide precipitation zone, adding dolomitic lime to the solution entering the magnesium hydroxide precipitation zone, thereby precipitating magnesium hydroxide and forming a solution of calcium sulfate, separating the solution of calcium sulfate from the precipitated magnesium hydroxide, and returning a portion of the magnesium hydroxide from the magnesium hydroxide precipitation zone into the primary neutralization zone for treating additional quantities of pickle liquor entering said primary neutralization zone.

4. The process of treating pickle liquor containing iron sulfate, which comprises the steps of mixing an amount of magnesium hydroxide with said pickle liquor sufficient to partially neutralize said pickle liquor and to produce an iron hydroxide precipitate, separating the precipitate so formed from the liquor, then completely neutralizing said liquor with calcium hydroxide to precipitate the balance of the iron as a hydroxide and leave a mixed solution of calcium sulfate and magnesium sulfate, diluting the mixed solution sufficiently to prevent subsequent precipitation of calcium sulfate upon treatment with dolomitic lime, and mixing dolomitic lime with said sulfate solution to precipitate magnesium hydroxide and leave a solution of calcium sulfate.

5. The cyclic process for the treatment of waste pickle liquor containing an acid and a ferric and a ferrous salt, which comprises mixing an amount of magnesium hydroxide with said liquor sufficient to neutralize the free acid and precipitate the ferric iron in the form of ferric hydroxide and form a solution of magnesium salt of the acid, separating said magnesium salt solution from said ferric hydroxide, then completely neutralizing said solution with calcium hydroxide to precipitate the ferrous iron in the form of ferrous hydroxide, thereby forming a mixed solution of calcium sulfate and magnesium sulfate, separating said precipitated ferrous hydroxide from said solution, diluting said solution sufficiently to prevent subsequent precipitation of calcium sulfate when treated with dolomitic lime, adding dolomitic lime to said solution to precipitate magnesium hydroxide, and utilizing a portion of said magnesium hydroxide for the treatment of additional quantities of waste liquor.

6. The cyclic process for the treatment of waste pickle liquor containing free sulfuric acid, ferric sulfate and ferrous sulfate, which comprises mixing magnesium hydroxide with said liquor to neutralize free acid and precipitate all of the ferric iron as ferric hydroxide and a minor portion of the ferrous iron as ferrous hydroxide, separating the resulting precipitate from said solution, adding calcium hydroxide to said liquor to precipitate the balance of the iron as ferrous hydroxide, thereby forming a mixed solution of calcium sulfate and magnesium sulfate, the liquor being kept sufficiently dilute to prevent precipitation of calcium sulfate therefrom, separating said solution from said ferrous hydroxide, adding dolomitic lime to said solution to precipitate magnesium hydroxide, and utilizing a portion of said magnesium hydroxide for the treatment of additional quantities of waste liquor.

JAMES M. KAHN.
EDWARD KOMINEK, Jr.

REFERENCES CITED

The following references are of record in the file of this patent:

UNITED STATES PATENTS

| Number | Name | Date |
|---|---|---|
| 232,110 | Braconnier | Sept. 14, 1880 |
| 1,269,441 | Hoffman et al. | June 11, 1918 |
| 1,536,326 | Brookby | May 5, 1925 |
| 1,824,936 | Travers | Sept. 29, 1931 |
| 2,258,310 | Abbott | Oct. 7, 1941 |

FOREIGN PATENTS

| Number | Country | Date |
|---|---|---|
| 4,397 | Great Britain | 1881 |
| 317,961 | Great Britain | Aug. 29, 1929 |
| 376,683 | Great Britain | July 14, 1932 |

OTHER REFERENCES

Industrial and Engineering Chemistry, vol. 31, No. 11, page 1368, Nov. 1939.